United States Patent [19]

Takanashi

[11] Patent Number: 4,485,422
[45] Date of Patent: Nov. 27, 1984

[54] SECONDARY ARC EXTINCTION DEVICE

[75] Inventor: Tomio Takanashi, Yokohama, Japan

[73] Assignee: Tokyo Shibaura Denki Kabushiki Kaisha, Kawasaki, Japan

[21] Appl. No.: 381,395

[22] Filed: May 24, 1982

[30] Foreign Application Priority Data

May 29, 1981 [JP] Japan ................................. 56-82128

[51] Int. Cl.³ ............................................. H02H 7/22
[52] U.S. Cl. .......................................... 361/43; 361/7; 361/54; 361/111; 323/205; 323/210; 307/134
[58] Field of Search .......................... 361/43, 1, 2, 4, 7, 361/5, 6, 54, 111, 110, 113; 307/89, 134, 135; 323/205, 206, 208, 209, 210, 211, 222

[56] References Cited

U.S. PATENT DOCUMENTS 4,367,507 1/1983 Shperling et al. .................... 361/43

OTHER PUBLICATIONS

"The application of controlled reactive compensator for single pole switching on long EHV line sections", Woodford, EPRI/IREQ, pp. 348-349, Sep. 19-21, 1979.
"Soviet Inventions Illustrated", Week C 30, Sep. 3, 1980.
"Soviet Inventions Illustrated", Week C 15, May 21, 1980.
European Search Report EP 82302651.3 Berlin 8/24/82.

Primary Examiner—Patrick R. Salce
Attorney, Agent, or Firm—Oblon, Fisher, Spivak, McClelland & Maier

[57] ABSTRACT

A secondary arc extinction device in an electric power system, including a bus bar; an electric power line connected to the bus bar; protective relaying means connected to the bus bar; first reactance means having two terminals, one terminal of which is connected to the electric power line; a transformer having a primary winding and a secondary winding connected between the other terminal of the first reactance means and ground; second reactance means connected to the secondary winding of the transformer; and means for controlling the second reactance means in response to the protective relaying means.

8 Claims, 10 Drawing Figures

SECONDARY ARC EXTINCTION DEVICE

BACKGROUND OF THE INVENTION

1. Field of the Invention

This invention relates to a secondary arc extinction device in an electric power system in accordance with which a secondary arc is actively extinguished so as to shorten substantially a reclosing nonvoltage period of time.

2. Description of the Prior Art

In general, there is employed a multiphase, multiconductor transmission line having a large electrostatic coupling capacity between phases and between high voltage lines of large current capacity. In case a short-circuit is caused in a transmission line by a damage caused by lightning or the like, however, an induced electric current is supplied from other whole phases or whole lines via the above-mentioned electrostatic coupling despite the fact that the line is protected by circuit breakers at both the ends thereof. As the result, an arc generated by back flashover (which is hereinafter referred to as a "secondary arc") is not extinguished. Thus, when the single/multiphase reclosing is effected, it is required to have a suficient reclosing nonvoltage period of time, which is not desired from the standpoint of the stability of the system.

Hereinafter, an explanation is given concerning this. If there is caused a short-circuit in a transmission line in an electric power system, an arc current continues to flow for a time despite the fact that the circuit breakers at both the ends thereof terminate the line. Thus, the problem condition is not removed. This is due to the fact that the secondary arc continues as shown in FIG. 1 by an electrostatic induction by the whole phase or the whole line. This tendency is more outstanding in a high voltage transmission line of large current capacity wherein the electrostatic coupling capacity between lines is large.

In view of the above, it is under consideration to provide a reactor to cancel the electrostatic capacity between lines in a high voltage transmission line of large current capacity so as to extinguish the secondary arc. The arrangement of this extinguishing reactor is as shown in FIG. 2 and FIG. 3. The extinguishing reactor is provided at the side of the line of an electric station or a substation.

The extinguishing function by the reactor which is shown in FIG. 2 is explained as follows. The matrix of the transmission line admittance $Y_C$ is expressed by the formula (1), while the matrix of the extinguishing reaction admittance $Y_L$ is expressed by the formula (2).

$$Y_C = \begin{bmatrix} Y_{C11} & -Y_{C21} & -Y_{C31} \\ -Y_{C12} & Y_{C22} & -Y_{C32} \\ -Y_{C13} & -Y_{C23} & Y_{C33} \end{bmatrix}, \quad (1)$$

$$Y_L = \begin{bmatrix} Y_{L11} & -Y_{L21} & -Y_{L31} \\ -Y_{L12} & Y_{L22} & -Y_{L32} \\ -Y_{L13} & -Y_{L23} & Y_{L33} \end{bmatrix}, \quad (2)$$

The total admittance Y is as axpressed in the formula (3):

$$Y = Y_C + Y_L \quad (3)$$

Since the characteristics of $Y_L$ and $Y_C$ are different from each other, it becomes possible to make zero the mutual admittance as in the formula (4) by suitably choosing the value of $Y_L$. In other words, it becomes possible to make zero the coupling between the lines. As the consequence, it becomes pessible to extinguish the secondary arc.

$$Y = \begin{bmatrix} Y_{11} & 0 & 0 \\ 0 & Y_{22} & 0 \\ 0 & 0 & Y_{33} \end{bmatrix}, \quad (4)$$

However, it is impossible to make zero the electrostatic induction from a whole line in the case of juxtaposed transmission lines with the above-mentioned arrangement of an extinguishing reactor. (Reference formula (5) as well as formula (6)). It is very difficult to distinguish the secondary arc.

$$Y_C = \begin{bmatrix} Y_{C11} & Y_{C21} & - & - & - & -Y_{C61} \\ -Y_{C12} & Y_{C22} & - & - & - & -Y_{C62} \\ -Y_{C13} & - & Y_{C33} & - & - & -Y_{C63} \\ -Y_{C14} & - & - & Y_{C44} & - & -Y_{C64} \\ -Y_{C15} & - & - & - & Y_{C55} & -Y_{C65} \\ -Y_{C16} & - & - & - & - & Y_{C66} \end{bmatrix}, \quad (5)$$

$$Y_L = \begin{bmatrix} Y_{L11} & -Y_{L21} & -Y_{L31} & 0 & 0 & 0 \\ -Y_{L12} & Y_{L22} & -Y_{L32} & 0 & 0 & 0 \\ -Y_{L13} & -Y_{L23} & Y_{L33} & 0 & 0 & 0 \\ 0 & 0 & 0 & Y_{L44} & -Y_{L54} & -Y_{L64} \\ 0 & 0 & 0 & -Y_{L45} & Y_{L55} & -Y_{L65} \\ 0 & 0 & 0 & -Y_{L46} & -Y_{L56} & Y_{L66} \end{bmatrix}, \quad (6)$$

Then, in order to remove the above-mentioned drawbacks, it has recently been considered to arrange an extinguishing reactor in such a way as shown in FIG. 3.

The extinction function in accordance with the reactor which is shown in FIG. 3 is nextly explained. The admittance matrix of the extinguishing reactor which is shown in FIG. 3 is expressed by the formula (7). If $Y_L$ is chosen in the formula (7) in such a way that the admittance of the transmission line in the formula (5) is cancelled, it becomes possible to make zero the electrostatic induction from the adjacent line, thereby making it possible to extinguish the secondary arc.

$$Y_L = \begin{bmatrix} Y_{L11} & - & - & - & - & -Y_{L61} \\ -Y_{L12} & Y_{L22} & - & - & - & -Y_{L62} \\ -Y_{L13} & - & Y_{L33} & - & - & -Y_{L63} \\ -Y_{L14} & - & - & Y_{L44} & - & -Y_{L64} \\ -Y_{L15} & - & - & - & Y_{L55} & -Y_{L65} \\ -Y_{L16} & - & - & - & - & Y_{L66} \end{bmatrix}, \quad (7)$$

On the other hand, there has conventionally been considered a system in accordance with which the value of $Y_L$ in the above-mentioned reactor system is set constant or at a certain calculated value by identifying the troubled phase. However, the value of $Y_L$ then does not necessarily become the most suitable value and it becomes impossible to extinguish the secondary arc within a short period of time because the admittance of the transmission line varies due to the troubled phase and, in addition, considerable errors are contained in calculating the line constant which also becomes the reference in setting the most suitable $Y_L$ by calculation.

SUMMARY OF THE INVENTION

Accordingly, the object of the present invention is to provide a secondary arc extinction device in an electric power system in accordance with which the reactance of the reactor relative to the neutral point is varied within a range inclusive of the most suitable reactance on calculation so that the error in the most suitable arc extinction reactor admittance by calculation is compensated, thereby making it possible to extinguish the secondary arc within a short period of time.

Briefly, in accordance with one aspect of this invention, a secondary arc extinction device is provided which includes a bus bar; an electric power line connected to the bus bar; protective relaying means connected to the bus bar; first reactant means having two terminals, one terminal of the first reactance means being connected to the electric power line; a transformer having a primary winding and a secondary winding connected between the other terminal of the first reactance means and ground; second reactance means connected to the secondary winding of the transformer; and means for controlling the second reactance means in response to the protective relaying means.

BRIEF DESCRIPTION OF THE DRAWINGS

A more complete appreciation of the invention will be readily obtained as the same becomes better understood by reference to the following detailed description when considered in connection with the accompanying drawings, wherein.

DETAILED DESCRIPTION OF THE PREFERRED EMBODIMENTS

Figure 1:
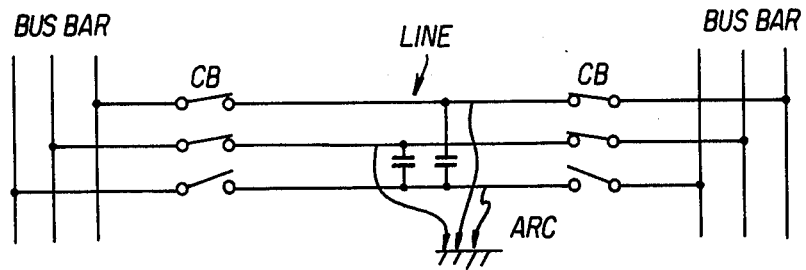
FIG. 1 is a schematic circuit diagram of a conventional electric power transmission line illustrating occurrance of a flashover.
Figure 2:
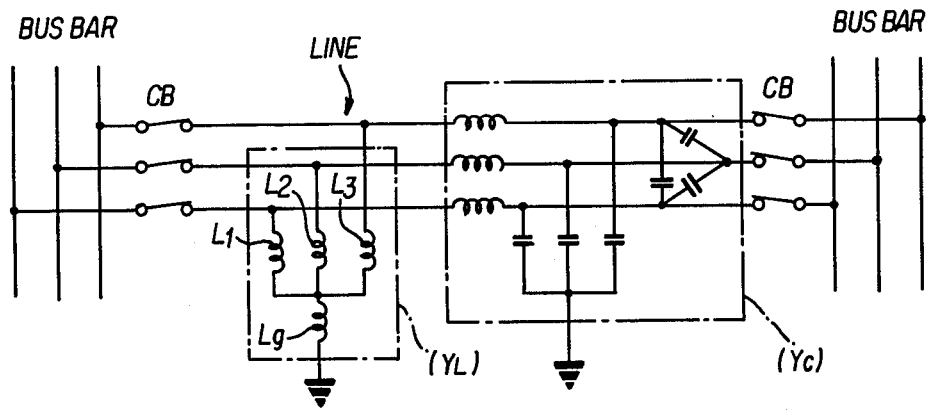
FIG. 2 is a schematic circuit diagram of a conventional electric power transmission line including an equivalent circuit of an extinguishing reactor and power transmission line admittances.
Figure 3:
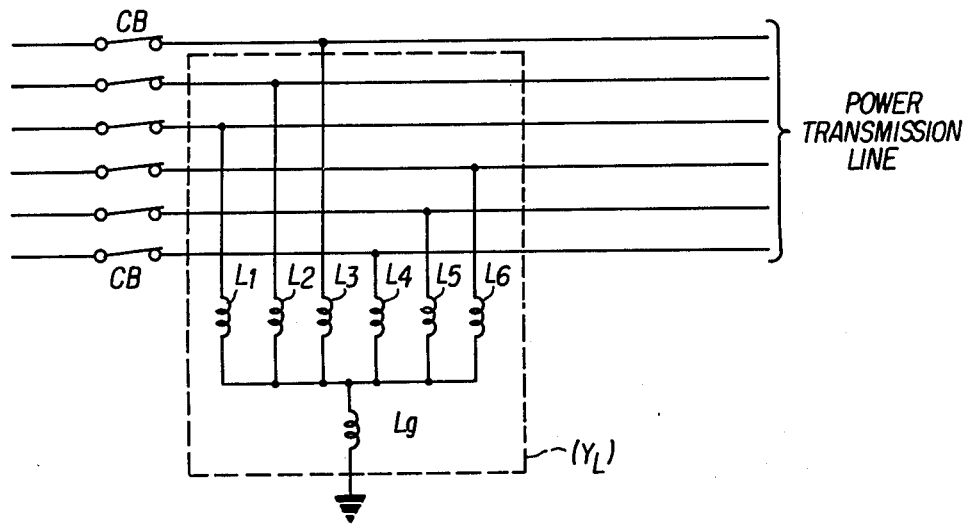
FIG. 3 is a schematic circuit diagram of a pair of conventional juxtaposed lines of a power transmission line.
Figure 4:
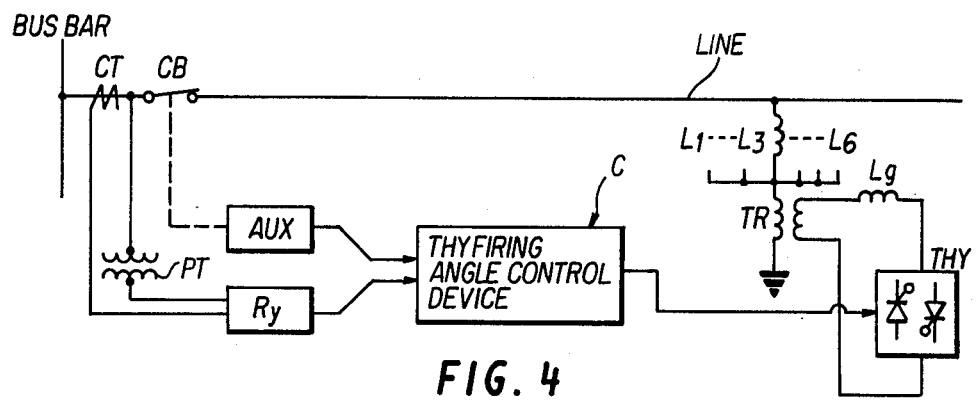
FIG. 4 is a schematic circuit diagram showing one embodiment of a secondary arc extinction device in accordance with the present invention.

Referring now to the drawings, wherein like reference numerals and letters designate identical or corresponding parts throughout the several views, and more particularly to FIG. 4 thereof, wherein one preferred embodiment of a secondary arc extinction device in accordance with this invention is shown, reactors $L_1$–$L_6$ are connected to respective phases as well as a transformer TR for dropping voltage at a service entrance of a line. There is connected in series a thyristor THY-phase control neutral point reactor Lg to the secondary coil of this transformer TR. This reactor Lg is capable of continuously varying the reactance value (admittance) under the control of a thyristor-firing angle control device C which is connected to the thyristor THY to vary the firing angle. This firing angle control device C is started by a signal, which is the signal at the time when a problem is caused, from an auxiliary contact of a circuit breaker CB or a protective relay Ry.

Figure 5:
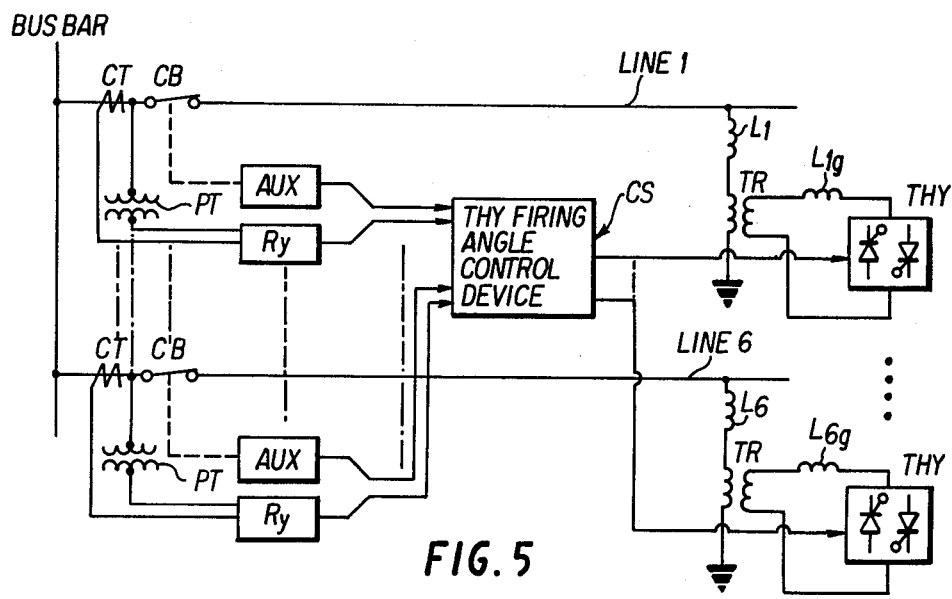
FIG. 5 is a schematic circuit diagram showing another embodiment of a secondary arc extinction device in accordance with the present invention.

Referring to FIG. 5, an alternative and preferred embodiment of the secondary arc extinction device in accordance with the present invention shown in more detail. The arrangements secondary arc detection devices shown in FIG. 4 are provided for each phase of the device shown in FIG. 5. In addition, the thyristor firing angle control device CS of FIG. 5 includes a plurality of thyristor firing angle control devices C as shown in FIG. 4 and described hereinafter in detail in relation to FIG. 6.

Now, if any problem is caused in the line as shown in FIG. 5, a conventional protective relay Ry responds to signals from a current transformer CT and a potential transformer PT connected to the line and generates a signal for tripping a circuit breaker CB. When the circuit breaker CB is tripped, the auxiliary contact (b contact) of circuit breaker CB is closed. Then, the signals from protective relay Ry and auxiliary contact of circuit breaker CB are supplied to thyristor firing angle control device CS which choses an optimum reactance of each reactor in such a way that the capacitance between the lines and the reactance between the lines resonate in parallel.

Thus, the thyristor firing angle control device CS generates a signal for controlling each thyristor THY so as to produce parallel resonance as mentioned above. In thyristor firing angle control device C shown in FIG. 6, a reference firing angle selection/output circuit 12 (hereinafter referred to as "RFASO circuit") is supplied signals from the auxiliary contact of circuit breaker CB and protective relay R$y$, and generates a signal corresponding to the most suitable firing angle $\alpha_0$.

The operation of RFASO circuit 12 is nextly explained. In general, there are several causes of problems, for instance ground fault, interphase fault, etc. Accordingly, in dependence on the kind of problem or the line in which a problem occurs, the reactance value has to change so as to resonate in parallel, and for each case the change must be determined in advance. In light of this, the reactance value is set in RFASO circuit 12 so as to generate a signal corresponding to the kind of problem, etc.

In FIG. 5, when a problem occurs in line one, thyristor THY for line one is not controlled, but thyristors THY for lines two, three, . . . and six are controlled so that the reactance value for each line is changed in accordance with the kinds of problem.

The output signal from RFASO circuit 12 is supplied to an adding circuit 13 and a step firing angle generating circuit 15. The output of adding circuit 13 is connected to thyristor THY through firing pulse generator circuit 13 provided with a limit circuit (not shown) which generates a firing pulse in response to the desired firing angle $\alpha$.

On the other hand, step firing angle generating circuit 15 generates a step signal $\Delta\alpha$, $2\Delta\alpha$, $3\Delta\alpha$, . . . $n\Delta\alpha$, but the output of step firing angle generating circuit 15 is reset whenever the limit circuit of firing pulse generation circuit 14 is operated.

A polarity changing circuit 16, which is well-known, having an inverting circuit passes the output from step firing angle generating circuit 15 to adding circuit 13.

Figure 7:
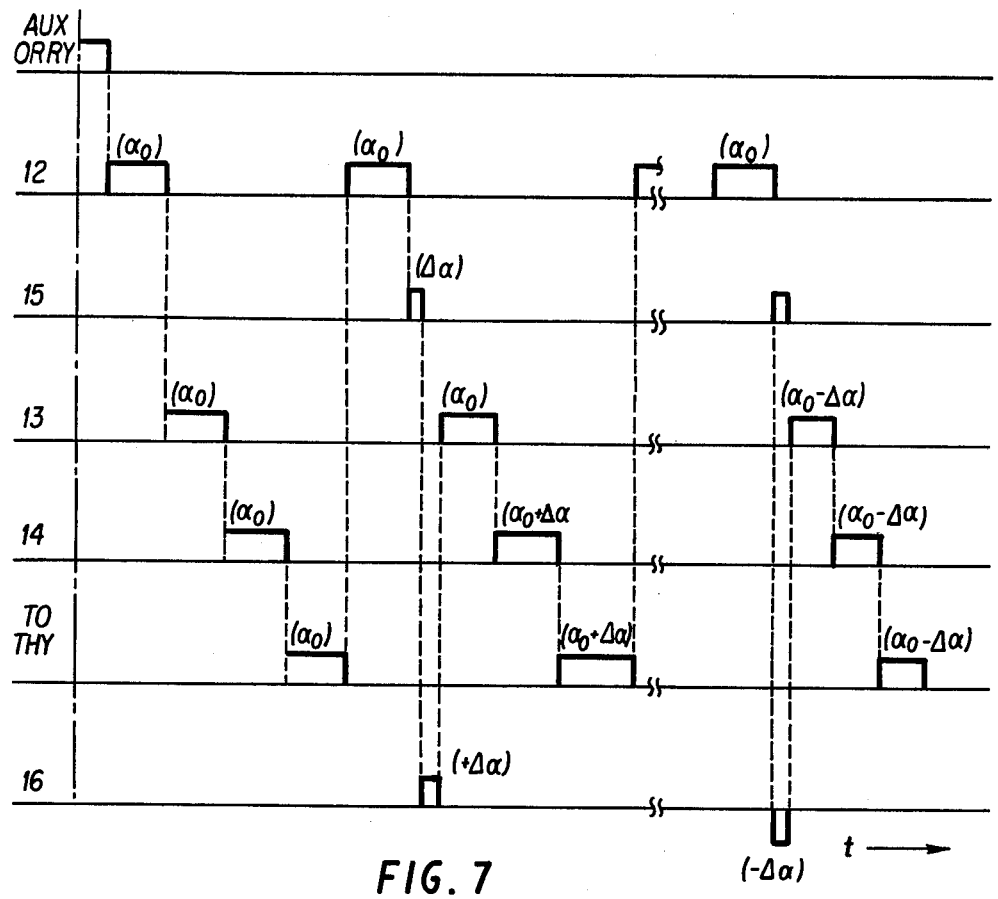
FIG. 7 is a timing diagram explaining the operation of the controlling device illustrated in FIG. 6.

When the limit circuit of firing pulse generating circuit 15 is operated, the output $\Delta\alpha$ from step firing angle generating circuit 15 is inverted to a negative polarity as shown in FIG. 7.

Figure 6:
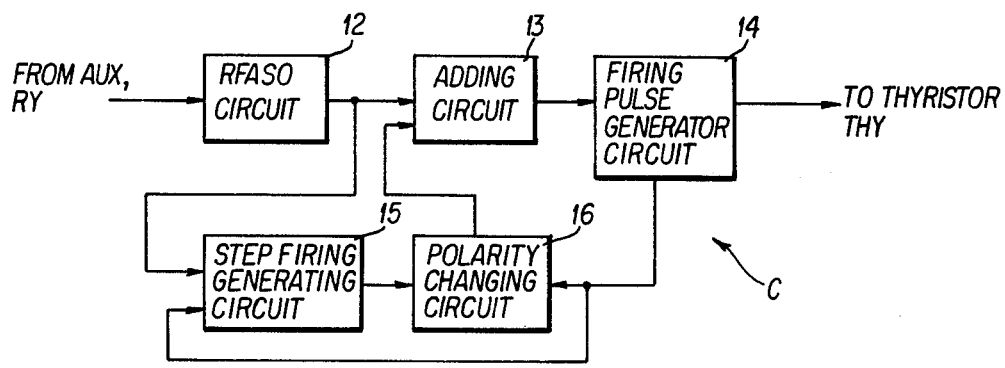
FIG. 6 is a block diagram of a controlling device of FIG. 4.

Now, if any problem is caused in the line as shown in FIG. 6 in the arrangement as mentioned above, the auxiliary contact of the circuit breaker CB or the protective relay Ry develops a signal indicative of the fact and the manner in which the problem is caused, which is sent to a reference firing angle selection/output circuit 12. Then, the most suitable firing angle $\alpha_0$ is chosen which is calculated in advance based on the manner in which the problem is caused. Then, this output $\alpha_0$ is transmitted to a firing pulse generator circuit 14. Two cases are considered at this time. That is, one is the case wherein the thyristor THY is instantaneously varied from a firing angle $\beta$ prior to the occurrence of a problem to the firing angle $\alpha_0$ so as to be ignited. The other is the case wherein the thyristor is ignited while being incrementally varied to the firing angle $\alpha_0$.

For convenience sake of explanation, an embodiment directed to the former case is hereinafter explained, but it is needless to say the latter case is useful to the present invention.

The operation after the firing angle is reached to value $\alpha_0$ as above-mentioned, is below-explained. Adding circuit 13 and step firing angle generating circuit 15 commence to operate in response to a signal from RFASO circuit 12.

In addition, adding circuit 13 is synchronized with step firing generating circuit 15 so as to add only basic firing angle $\alpha_0$ as an initial input of adding circuit 13.

By supplying a signal from RFASO circuit 12, step firing generating circuit 15 commences and generates outputs $\Delta\alpha, 2\Delta\alpha, \ldots n\Delta\alpha$ to be transmitted to adding circuit 13 via polarity changing circuit 16.

As a result, the output of adding circuit 13 gradually increases by increments of $\Delta\alpha$, as $\alpha_0, \alpha_0+\Delta\alpha, \alpha_0+2\Delta\alpha, \ldots \alpha_0+n\Delta\alpha$. Thyristor THY is fired in accordance with the output of adding circuit 13 and stopped when firing pulse generator circuit 14 reaches a predetermined limit value (i.e., upper limit).

Then step firing generating circuit 15 is reset from $n\Delta\alpha$ to $\Delta\alpha$ and the output polarity of step firing generating circuit 15 is inverted to a negative polarity by polarity changing circuit 16 in accordance with the output of firing pulse generator circuit 14. Thus, thyristor THY is controlled in accordance with output ($\alpha_0-\Delta\alpha, \alpha_0-2\Delta\alpha, \ldots \alpha_0-n\Delta\alpha$) of adding circuit 13. Then when the output of adding circuit 13 reaches a predetermined value (i.e., lower limit), the signal to thyristor THY is stopped and the operation is completed.

Figure 8:
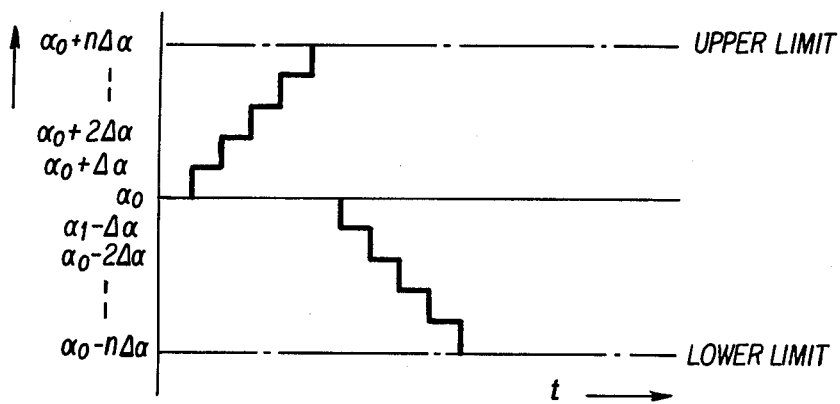
FIGS. 8 and 9 are timing diagrams explaining the control of the firing angle of a thyristor to be controlled by the controlled device shown by FIG. 6.

Since the firing angle varies with reference to value $\alpha_0$ as the center continuously or with some steps as shown in FIGS. 7 and 8 by employing the means as mentioned above, it becomes possible to vary the reactance of the neutral point in correspondence therewith, thereby making it possible that the most suitable reactor admittance is obtained in accordance with which the extinguishing reactor admittance cancels the line admittance within a short period of time. Thus, it becomes possible to extinguish the secondary arc.

It must be said that the present invention is not limited to the above-mentioned embodiments. It is possible that the ignition angle $\alpha$ is varied to a maximum ignition angle which is determined in advance in a continuous manner or with some steps $\Delta\alpha$ with the reference firing angle $\alpha_0$ as the initial value and after that, it is varied in the same way to the minimum firing angle. In addition, it is also possible in accordance with a device (not shown) similar to that shown in FIG. 5 that the firing angle is first of all varied from the initial value to the minimum firing angle, and after that, it is varied to the maximum firing angle.

Figure 9:
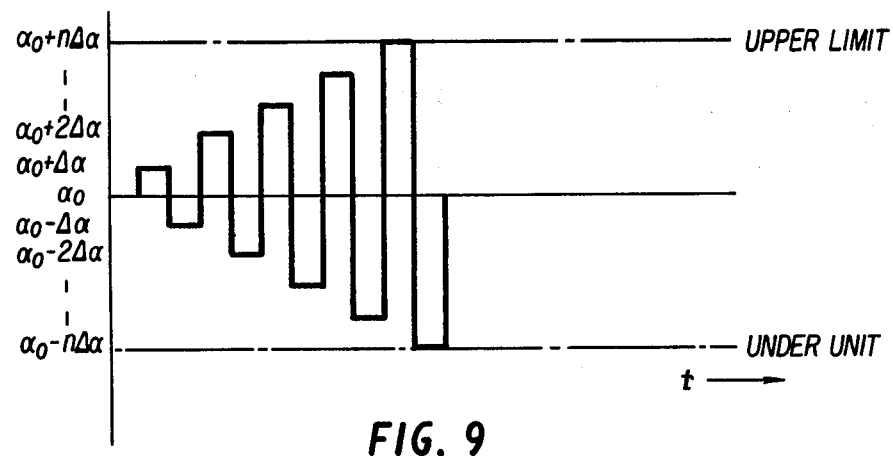

Nextly, another embodiment of thyristor firing angle device C for generating a gate pulse as shown in FIG. 9 is briefly explained. Polarity changing circuit 16 functions to cyclically polarity-switch during output, i.e., $\Delta\alpha, 2\Delta\alpha, \ldots n\Delta\alpha$ from step firing generating circuit 15 as shown in FIG. 9.

Figure 10:
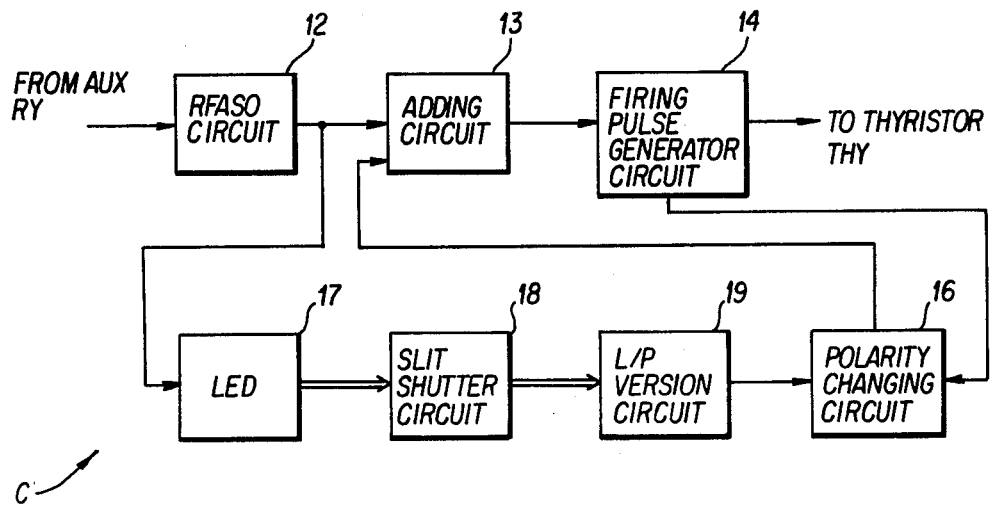
FIG. 10 is a block diagram showing another embodiment of the controlling device illustrated in FIG. 6.

Still another embodiment of thyristor firing angle control device C for generating a gate pulse will be explained with reference to FIG. 10, wherein a series circuit of a light emitting diode LED 17, a slit shutter circuit 18 and a light/pulse conversion circuit 19 is provided instead of step firing generating circuit 15.

Since such a series circuit using photo equipment is well-known in this field, the detailed explanation thereof is omitted.

In brief, light emitting diode LED 17 is connected to RFASO circuit 12 and emits light in accordance with the signal from RFASO circuit 12. Slit shutter circuit 18 chops the light emitted from light emitting diode LED 17, and includes a conventional rotating disk having a plurality of holes disposed at a circumference thereof.

Light/pulse conversion circuit 19, which receives chopped light from slit shutter circuit 18, generates signals $\Delta\alpha, 2\Delta\alpha, \ldots n\Delta\alpha$ in the same manner as if output from firing generating circuit 15 shown in FIG. 6. Thus, adding circuit 13 shown in FIG. 10 fundamentally generates the same signal shown in FIGS. 8 or 9.

It is also acceptable that the initial firing angle $\alpha_0$ and the next $\alpha_1$ are synchronized to each other and furthermore, the step firing angle $n\Delta\alpha$ (n times $\Delta\alpha$) is developed as an output so as to vary the firing angle based on equating the number of zero point passages of the ground reactor electric current to the number of the thyristor to be ignited in FIG. 4 and FIG. 5 and the synchronization of the firing angle is effected to the zero point base of the electric current. The abovementioned n is a numeral such as the number of passages through the zero point of the electric current or a multiple thereof.

As mentioned before, since the electrostatic coupling is strong between high voltage lines of large current capacity, the period of time for the secondary arc is long. However, it becomes possible to obtain the most suitable reactor admittance which cancels this within a short period of time and which enables the early extinction of the arc, thereby making it possible that the single/multi-phase reclosing non-voltage is substantially shortened, which becomes very advantageous in the electric power system.

In accordance with the present invention as mentioned above, since the reactance of the neutral point reactor is varied within a certain range inclusive of the most suitable reactance on calculation, it becomes possible to provide a secondary arc extinction device in an electric power system in accordance with which the error in the calculated most suitable extinguishing reactor admittance is compensated for so as to extinguish the secondary arc within a very short period of time.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A secondary arc extinction device in an electric power system, comprising:
   a bus bar;
   an electric power line connected to said bus bar;
   protective relaying means connected to said bus bar;
   first reactance means having two terminals, one terminal of said first reactance means being connected to said electric power line;
   a transformer having a primary winding and a secondary winding connected between the other terminal of said first reactance means and ground;
   second reactance means includes a reactor and antiparallel thyristors connected in series with said reactor wherein said second reactance means is connected to said secondary winding of said transformer;
   a circuit breaker having an auxiliary contact connected between said bus bar and said electric power line for responding to the output of said protective relaying means;
   means for controlling said second reactance means in response to an output of one of said protective relaying means and said auxiliary contact of said circuit breaker;
   wherein said means for controlling includes means for varying the firing angle of said thyristors of said second reactance means about a predetermined value corresponding to said predetermined reactance.

2. A secondary arc extinction device as recited in claim 1, wherein said second reactance means are provided for each phase of said electric power line.

3. A secondary arc extinction device according to claim 1 wherein said protective relaying means further includes:
   a current transformer connected to said bus bar;
   a potential transformer connected to said bus bar;
   connecting means for connecting said current transformer, said potential transformer and said auxiliary contact of the circuit breaker to said controlling means.

4. A secondary arc extinction device as recited in claim 3, wherein said means for varying the firing angle of said thyristors of said second reactance means includes:
   first generating means for generating a signal corresponding to a predetermined reactance value to be resonated in response to said signal from said connecting means,
   second generating means connected to said first generating means for generating a deviated signal from said signal fo first generating means, and
   means for connecting said second generating means to said semiconductor switching element.

5. A secondary arc extinction device as recited in claim 4, wherein said second generating means includes:
   adding means connected to said first generating means;
   firing pulse generating means having a limit circuit connected to said adding means for generating firing pulses for said semiconducting switching element in response to said adding means;
   step firing angle generating means connected to said first generating means for generating a step signal and for resetting when said limit circuit of said firing pulse generating means is operated; and
   polarity changing means connected between said step firing generating means and said adding means for changing polarity of said step signal when said limit circuit of said firing pulse generating means is operated.

6. A secondary arc extinction device as recited in claim 4, wherein said second generating means includes:
   adding means connected to said first generating means;
   first pulse generating means having a limit circuit connected to said adding means for generating firing pulses in response to said adding means;
   light emitting means connected to said first generating means;
   slit shutter means coupled to said light emitting means for chopping light from said light emitting means;
   light-pulse converting means connected to said slit shutter means for converting said chopped light to pulses; and
   polarity changing means connected between said step firing generating means and said adding means for changing polarity of said deviated signal when said limit circuit of said firing pulse generating means is operated.

7. A secondary arc extinction device as recited in claim 4, wherein said second generating means comprises:
   means for generating a stepped signal deviated from said signal of first generating means.

8. A secondary arc extinction device as recited in claim 4, wherein said second generating means comprises:
   means for generating a stepped signal cyclically deviated from said signal of said first generating means.

* * * * *